US012707551B2

(12) United States Patent
Aliakseyeu et al.

(10) Patent No.: US 12,707,551 B2
(45) Date of Patent: Aug. 11, 2026

(54) SELECTING A MORE SUITABLE INPUT MODALITY IN RELATION TO A USER COMMAND FOR LIGHT CONTROL

(71) Applicant: SIGNIFY HOLDING B.V., Eindhoven (NL)

(72) Inventors: Dzmitry Viktorovich Aliakseyeu, Eindhoven (NL); Massimo Tumolo, Utrecht (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/271,090

(22) PCT Filed: Jan. 3, 2022

(86) PCT No.: PCT/EP2022/050016

§ 371 (c)(1),
(2) Date: Jul. 6, 2023

(87) PCT Pub. No.: WO2022/148723

PCT Pub. Date: Jul. 14, 2022

(65) Prior Publication Data

US 2024/0306280 A1 Sep. 12, 2024

(30) Foreign Application Priority Data

Jan. 8, 2021 (EP) .................................... 21150633

(51) Int. Cl.
*H05B 47/175* (2020.01)
*H05B 47/19* (2020.01)

(52) U.S. Cl.
CPC ......... *H05B 47/196* (2024.01); *H05B 47/175* (2020.01); *H05B 47/19* (2020.01); *H05B 47/1965* (2024.01)

(58) Field of Classification Search
CPC ....... G10L 15/16; G10L 15/18; H05B 47/155; G06N 20/00; G06N 3/08; G06N 7/02; G06F 3/0482; G06F 3/016; G06F 16/24578
See application file for complete search history.

(56) References Cited

U.S. PATENT DOCUMENTS 8,856,169 B2 * 10/2014 Zhang ..................... G06F 21/30 706/50
8,862,467 B1 * 10/2014 Casado ................... G10L 15/22 704/235

(Continued)

FOREIGN PATENT DOCUMENTS

CN 104854636 A 8/2015
CN 107079569 A 8/2017

(Continued)

*Primary Examiner* — Monica C King

(57) ABSTRACT

A system (1) for determining a suitability of an input modality (36) for providing a user command for controlling at least one lighting device (31) is configured to receive a signal indicative of the user command for controlling the at least one lighting device. The user command is provided by a user (69) using the input modality. The system is further configured to determine a suitability rating for the used input modality in relation to the user command, determine one or more further suitability ratings for one or more further input modalities (19, 37, 38) in relation to the user command, compare the suitability rating with the one or more further suitability ratings, and output information specifying an input modality recommended in relation to the user command. The recommended input modality is selected from the one or more further input modalities and has a further suitability rating which is higher than the suitability rating.

15 Claims, 5 Drawing Sheets

(56) References Cited

U.S. PATENT DOCUMENTS

| | | | | |
|---|---|---|---|---|
| 11,551,663 | B1 * | 1/2023 | Bissell | G06F 3/167 |
| 11,769,496 | B1 * | 9/2023 | Prasad | G10L 15/22 704/257 |
| 11,776,536 | B2 * | 10/2023 | Loghmani | G06F 16/745 704/257 |
| 11,790,919 | B2 * | 10/2023 | Aguilar Alas | G10L 25/63 704/275 |
| 11,887,580 | B2 * | 1/2024 | Bissell | G06N 3/0442 |
| 2011/0035404 | A1 * | 2/2011 | Morgan | H05B 47/155 707/769 |
| 2020/0104900 | A1 | 4/2020 | Mohiuddin Khan et al. | |
| 2023/0102157 | A1 * | 3/2023 | Jarosz | G10L 15/24 704/257 |
| 2023/0282201 | A1 * | 9/2023 | Bissell | G10L 13/086 704/270 |
| 2024/0185833 | A1 * | 6/2024 | Bissell | G06N 3/0442 |

FOREIGN PATENT DOCUMENTS

| | | | |
|---|---|---|---|
| CN | 109792821 | A | 5/2019 |
| WO | 2020244917 | A1 | 12/2020 |

* cited by examiner

300

SELECTING A MORE SUITABLE INPUT MODALITY IN RELATION TO A USER COMMAND FOR LIGHT CONTROL

CROSS-REFERENCE TO PRIOR APPLICATIONS

This application is the U.S. National Phase application under 35 U.S.C. § 371 of International Application No. PCT/EP2022/050016, filed on Jan. 3, 2022, which claims the benefit of European Patent Application No. 21150633.2, filed on Jan. 8, 2021. These applications are hereby incorporated by reference herein.

FIELD OF THE INVENTION

The invention relates to a system for determining a suitability of an input modality for providing a user command for controlling at least one lighting device.

The invention further relates to a method of determining a suitability of an input modality for providing a user command for controlling at least one lighting device.

The invention also relates to a computer program product enabling a computer system to perform such a method.

BACKGROUND OF THE INVENTION

Philips Hue portfolio of smart lighting products is continuously growing, and the combination of luminaries, accessories and services offered can vary and cover a variety of use cases. This number increases even more when all Hue-compatible products are brought into the picture (e.g. Alexa, or any IFTTT integration).

From the consumer perspective, it can be hard to find the optimal setup, or the right configuration needed to achieve a use case. This is confirmed by multiple user-studies on Hue customers, in which users reported missing features that were instead available, but not known to the user. For example, a user may just be interested in replacing the light bulbs and controlling them with a switch, while another user may be interested in a combination of voice control and buttons, that could improve his entertainment setup. The complexity behind a large portfolio made of versatile devices that can be used in multiple ways can lead the customers to make suboptimal choices when buying or configuring a product, leading to a poor user experience.

It is known in prior art to have mechanisms suggesting products based on simple specifications, for example the lux level. US 2020/0104900 A1 discloses a more advanced product recommendation system in which users can rate products using different input modalities (e.g. speech, text, bodily expressions). A rating input using a first input modality may be weighted differently than a rating input using a second input modality. However, these product recommendations do not consider the buyer's specific circumstances.

SUMMARY OF THE INVENTION

It is a first object of the invention to provide a system, which can be used to make it easier for a user to control at least one lighting device in his specific circumstances.

It is a second object of the invention to provide a method, which can be used to make it easier for a user to control at least one lighting device in his specific circumstances.

In a first aspect of the invention, a system for determining a suitability of an input modality of a first input type for providing a user command for controlling at least one lighting device comprises at least one receiver, at least one output interface, at least one processor configured to receive, via said at least one receiver, a signal indicative of said user command for controlling said at least one lighting device, said user command being provided by a user using said input modality of said first input type, determine a suitability rating for said used input modality in relation to said user command, determine one or more further suitability ratings for one or more further input modalities in relation to said user command, compare said suitability rating with said one or more further suitability ratings, and output, via said at least one output interface, information specifying an input modality of a second input type recommended in relation to said user command, said recommended input modality of said second input type being selected from said one or more further input modalities, said further suitability rating of said recommended input modality being higher than said suitability rating.

By comparing suitability ratings for the used input modality of the first input type and further input modalities in relation to the user command, an input modality of the second input type (different from said first input type) or set of input modalities of second input types may be selected/recommended that is more suitable for the specific circumstances of the user. Said used input modality and said one or more further input modalities may include one or more of voice input, light switch input, and sensor input, for example. The input modalities are inputs of a particular type. Different light control devices may be considered to be different types of input modalities, for example. Different types of buttons on different types of light switches may be considered to be different types of input modalities, for example. Different types of sensor input from different types of sensors may be considered to be different types of input modalities, for example.

The further input modalities may include only input modalities that are already available to the user, e.g. devices already present in the lighting system, or all input modalities that could potentially be used by the user, e.g. devices supported by the lighting system. The suitability rating and the one or more further suitability ratings may be determined by obtaining them for a (local) memory, for example. Alternatively, said suitability rating and said one or more further suitability ratings may be obtained from a further system, for example. Optionally, the outputted information includes the main reason for recommending the further input modality or modalities.

Said at least one processor may be configured to determine a suitability rating for an input modality based on whether it is already present in the lighting system. For example, devices that are already present in the lighting system may have their suitability slightly increased, so when there are two input modalities that fit better than the one that the user currently uses of which one is present and the other is not, the system may recommend the input modality that is already present. The suitability rating of an already present input modality in relation to another (previously received) user command may be taken into account when determining whether to recommend repurposing an already present device or buying another device of the same kind.

Said at least one processor may be configured to determine said suitability rating and said one or more further suitability ratings based on a size of a space in which said user command is provided. For example, the benefit/suitability of a voice assistant is typically higher in larger spaces.

Said at least one processor may be configured to determine said suitability rating and said one or more further suitability ratings based on a function of said space. The function of a space may represent how the space is used, for example.

Said at least one processor may be configured to determine said suitability rating and said one or more further suitability ratings based on a complexity of user interaction associated with providing said user command using said input modality. The complexity of the user interaction may depend on the locations of the lighting device and lighting control device(s). Finding and unlocking a mobile phone takes some effort and may therefore increase the complexity of the user interaction. Selecting three light scenes is less complex on a Hue tap switch than with the Hue app and if a user frequently selects three light scenes, the use of a Hue tap switch may be recommended.

Said at least one processor may be configured to determine said suitability rating for said used input modality of said first input type in relation to said user command in dependence on a specific action specified in said user command. Said specific action may comprise selecting any light scene, selecting a specific light scene, switching off all lighting devices, or switching on all lighting devices, for example. For instance, the information presented to the user may indicate "To directly select a scene, I recommend using a tap switch" or "To just select a scene, the tap switch may be a better choice than a dimmer switch".

Alternatively or additionally, said at least one processor may be configured to determine said suitability rating for said used input modality of said first input type in relation to said user command independent of a specific action specified in said user command. For instance, for any user command provided in a living room and/or large room, voice input may be preferred over light switch input. The content and context of the user command may be evaluated to determine whether the suitability rating should be determined dependent on or independent of the specific action specified in the user command.

Said suitability rating and said one or more further suitability ratings may be calculated based on input modalities used by other users in relation to said user command. Said other users may have a lighting system which has a similarity to a lighting system of said user which exceeds a first threshold and/or may have spaces which have a similarity to spaces of said user which exceeds a second threshold, for example. Similarity between lighting systems may be determined, for example, based on type of device, number of devices, relative location, and/or device settings (e.g. a lighting system may comprise a light control device of type "Tap switch" of which the relative location is the living room and the setting is to control all the living room lights). Similarity between spaces may be determined, for example, based on shape (e.g. square), size (e.g. m^2), function (e.g. bedroom vs living room), and/or content (e.g. two single beds versus one single versus one double or one central sofa versus sofa plus table) of the spaces.

As a first example, if many other users that have the same type and/or similarly sized spaces use a different input modality in relation to a command also performed by the user, this different input modality may be recommended to the user. As a second example, if many other users that have the same type of lighting devices and same type of light control devices use a different input modality in relation to a command also performed by the user, this different input modality may be recommended to the user.

The thresholds may be expressed in percentages, e.g. 70% or 80%. The first and second thresholds may be the same or different. As an example, if two users have six of respectively seven and eight spaces in common, a similarity between 75 (six divided by eight) and 85% (six divided by seven) may be determined.

Alternatively, said suitability rating and said one or more further suitability ratings may be calculated based on input modalities recommended by a lighting company (e.g. based on user testing) in relation to said user command.

Said at least one processor may be configured to determine settings for a lighting control device based on said user command, said lighting control device being associated with said recommended input modality of said second input type, and transmit, via said at least one output interface, said settings to said lighting control device. For example, if a user has configured a light scene for/in a first light control device (e.g. a dimmer switch) corresponding to a first input modality and a second input modality is more suitable for selecting this light scene, this light scene may be configured for/in a second light control device (e.g. smart speaker system) corresponding to the second input modality.

Said information may also specify a further recommended input modality in relation to said user command, said further recommended input modality being selected from said one or more further input modalities, said further suitability rating of said combination of said recommended input modality and said further recommended input modality being higher than said suitability rating. For example, in the bedroom, it may be preferably not to use voice control at certain hours in order not to wake up a partner. In that case, a combination of a smart speaker system and a smart button may be recommended. Voice control could then be used to turn on the light. The smart button could be attached to a side of the bed and could be used to turn off the light, e.g. after it has been used with a "reading" light scene.

Said at least one processor may be configured to determine said suitability rating for said used input modality of said first input type in relation to said user command by determining a user-independent suitability rating which is common to all users of said system and applying a user-dependent weight to said user-independent suitability rating. Said at least one processor may be configured to determine said user-dependent weight based on user-specified preferences and/or previous user commands provided by said user, for example. Certain aspects of the suitability are typically user independent, e.g. depend on the size of the space, function of the space, the locations of the devices, and/or the suitability of a light control device for certain types of commands. Certain other aspects of the suitability are typically user dependent. For example, certain users may not like to use their mobile device and/or voice assistant to control lights, e.g. because their voice assistant rarely understands their commands.

In a second aspect of the invention, a method of determining a suitability of an input modality of a first input type for providing a user command for controlling at least one lighting device comprises receiving a signal indicative of said user command for controlling said at least one lighting device, said user command being provided by a user using said input modality of said first input type, determining a suitability rating for said used input modality in relation to said user command, determining one or more further suitability ratings for one or more further input modalities in relation to said user command, comparing said suitability rating with said one or more further suitability ratings, and outputting information specifying an input modality recommended of a second input type in relation to said user command, said recommended input modality of said second input type being selected from said one or more further input modalities, said further suitability rating of said recommended input modality being higher than said suitability rating. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for determining a suitability of an input modality for providing a user command for controlling at least one lighting device.

The executable operations comprise receiving a signal indicative of said user command for controlling said at least one lighting device, said user command being provided by a user using said input modality of a first input type, determining a suitability rating for said used input modality in relation to said user command, determining one or more further suitability ratings for one or more further input modalities in relation to said user command, comparing said suitability rating with said one or more further suitability ratings, and outputting information specifying an input modality of a second input type recommended in relation to said user command, said recommended input modality of said second type being selected from said one or more further input modalities, said further suitability rating of said recommended input modality being higher than said suitability rating.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
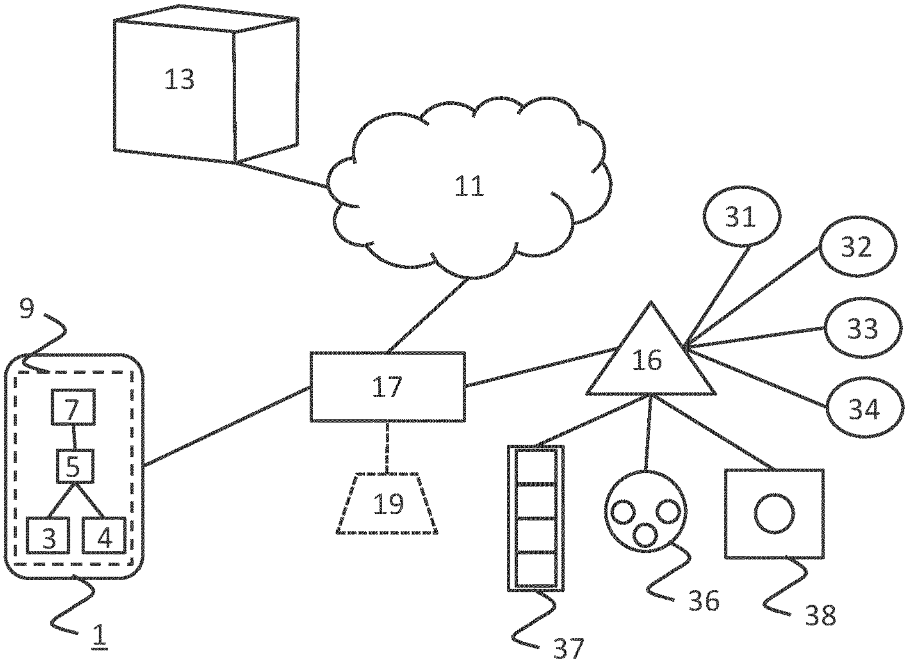
FIG. 1 is a block diagram of a first embodiment of the system.

FIG. 1 shows a first embodiment of the system for determining a suitability of an input modality for providing a user command for controlling at least one lighting device. In this first embodiment, the system is a mobile device 1. A lighting system comprises a bridge 16, lighting devices 31-34, and light control devices 36-38. Lighting devices 31-34 can be controlled with light control devices 36-38 via bridge 16. For example, light control device 37 may be used to control lighting device 33.

Lighting devices 31-34 may be Philips Hue lamps, for example. The bridge 16 may be a Philips Hue bridge, for example. In the example of FIG. 1, the light control devices 36-38 are different types of light switches. The lighting devices 31-34 and the light control devices 36-38 may communicate with the bridge 16 using Zigbee technology, for example. The bridge 16 is connected to a wireless LAN access point 17, e.g. via Wi-Fi or Ethernet. The wireless LAN access point 17 is connected to the Internet 11.

Mobile device 1 and Internet server 13 are able to control lighting devices 31-34 via the wireless LAN access point 17 and the bridge 16. The Internet server 13 is also connected to the Internet 11. Instead of a single Internet server, a cluster of Internet server may be used. This cluster may be part of one or more clouds.

The mobile device 1 comprises a transceiver 3, a transmitter 4, a processor 5, memory 7, and a touchscreen display 9. The processor 5 is configured to receive, via the receiver 3, a signal indicative of the user command for controlling lighting device 31 and/or 32. In the embodiment of FIG. 1, this signal is received from the bridge 16. The user command is provided by a user using an input modality, e.g. a button on one of the light control devices 36-38 or the touchscreen display 9 of the mobile device 1.

The processor 5 is further configured to determine a suitability rating for the used input modality in relation to the user command, determine one or more further suitability ratings for one or more further input modalities in relation to the user command, and compare the suitability rating with the one or more further suitability ratings.

The processor 5 is also configured to output, via the touchscreen display 9, information specifying an input modality recommended in relation to the user command. The recommended input modality is selected from the one or more further input modalities. The further suitability rating of the recommended input modality is higher than the suitability rating.

In a first implementation, (the processor 5 of) the mobile device 1 calculates the suitability rating and the one or more further suitability ratings itself. In a second implementation, the processor 5 is configured to determine the suitability rating and the one or more further suitability ratings by obtaining the suitability rating and the one or more further suitability ratings from the Internet server 13.

Figure 2:
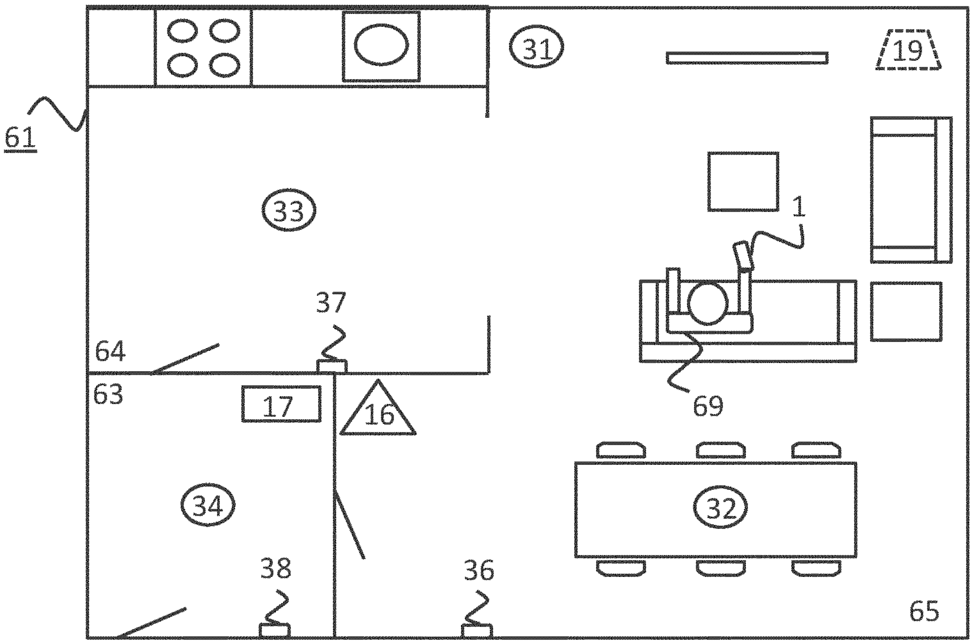
FIG. 2 shows an example of spaces in which user commands may be provided.

FIG. 2 shows an example of spaces in which user commands may be provided. A first floor 61 of a home consists of a hallway 63, a kitchen 64, and a living room 65. Wireless LAN access point 17, lighting device 34, and light control device 38 have been installed in the hallway 63. Lighting device 33 and light control device 37 have been installed in the kitchen 33. Bridge 16, lighting devices 31 and 32, and light control device 36 have been installed in the living room 65.

The light control device 36 is a light switch with multiple buttons. Each button can be associated with a light scene and each light scene can be associated with one or more lighting devices. In the example of FIG. 2, one light scene has been associated with lighting device 32 and two light scenes have been associated with lighting device 31. Each of these three light scenes is associated with a different button of light control device 36.

In the example of FIG. 2, a user 69 is sitting on a couch in the living room 65 holding the mobile device 1 of FIG. 1. Before the user 69 sat down on the couch, he switched on the lighting device 31 with light control device 36. At a certain moment, the user 69 wants to change the scene, and therefore walks to the light control device 36 and presses a button.

Shortly thereafter, or at another suitable time, the mobile device 1 provides a recommendation to the user 69 to use a smart speaker system to control the lighting device 31. The mobile device may recommend this further input modality because the button to change the scene was pressed in a living room and/or in a large room, for example.

After the user 69 has installed a new smart speaker system 19, and a wireless connection between the smart speaker system 19 and the wireless LAN access point 17 has been setup (see FIG. 1), the mobile device 1 or the bridge 16 detects the new smart speaker system 19 and configures the smart speaker system 19 with at least the two light scenes associated with the lighting device 31. This configuration may be stored in the smart speaker system 19 itself or on a cloud server used by the smart speaker system 19, for example.

Instead of a smart speaker system, the mobile device 1 might recommend the use of an additional light switch in the living room, e.g. a tap switch or a smart button, which could be placed closer to the lighting device 31 than light control device 36. For example, if the user has programmed the lighting device 34 to turn on and off automatically based on a schedule and does not really use the light control device 38, which is a smart button, the user could move the light control device 38 to the rear side of the living room 65. The advantage of voice control is that it is beneficial in larger spaces. However, selecting a light scene is easier with a tap switch or smart button than by using voice control.

The mobile device 1 may use a baseline scoring method that defines the optimal input modality or set of input modalities that would maximize the value of a user interaction with the lighting system. Such a method may determine the value that each (reasonable) device or combination of devices would generate for a given interaction. Furthermore, user defined weights may be used for baseline values that are based and dependent on user preferences, usage over time, the time of the day, or a combination of these. A recommendation for an optimal set of interaction devices may then be generated based on baseline scores and user defined weights. Weights representing whether input modalities are already present in the lighting system may also be applied.

If the mobile device 1 recommends repurposing an existing device, it may also recommend another input modality to replace the input modality being repurposed. For example, the mobile device 1 may propose a dimmer switch and at the same time propose a better solution for the part of the lighting system that is currently controlled by the dimmer switch, such that the user could reconfigure the dimmer switch he has and use a different input modality for the space that was previously controlled by the dimmer switch.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The processor 5 may use touch screen display 9 to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-34 are controlled by the mobile device 1 via the bridge 16. In an alternative embodiment, one or more of the lighting devices 31-34 are controlled by the mobile device 1 without a bridge, e.g. via the Internet server 13 and the wireless LAN access point 17 or directly via Bluetooth. The lighting devices 31-34 may be capable of receiving and transmitting Wi-Fi signals, for example.

Figure 3:
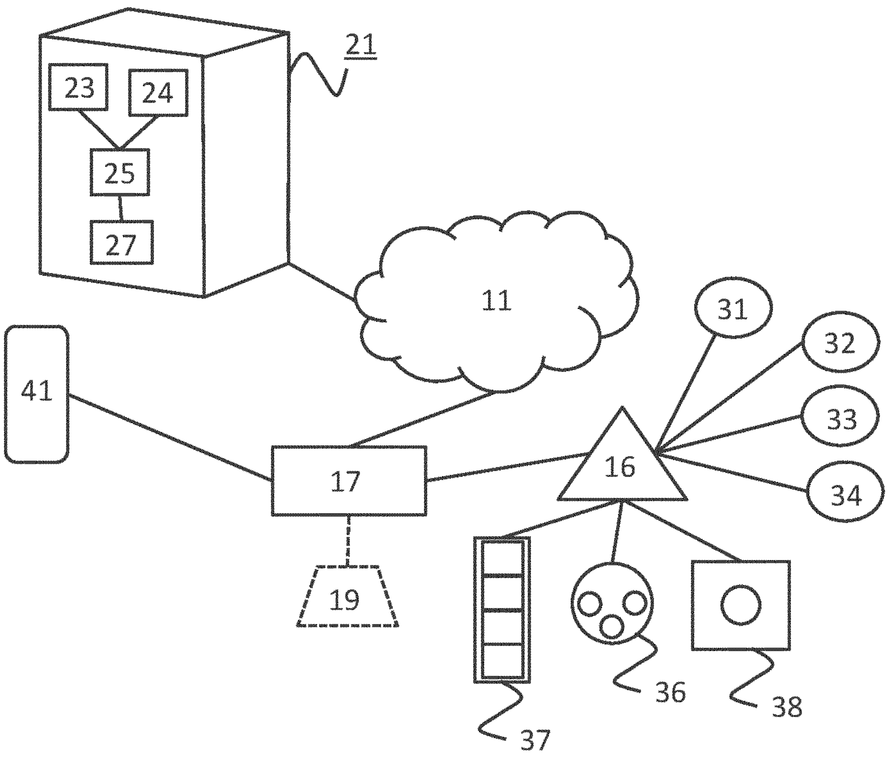
FIG. 3 is a block diagram of a second embodiment of the system.

FIG. 3 shows a second embodiment of the system for determining a suitability of an input modality for providing a user command for controlling at least one lighting device. In this second embodiment, the system is a computer 21. The computer 21 is connected to the Internet 11 and acts as a server. The computer 21 may be operated by a lighting company, for example. In the embodiment of FIG. 3, the computer 21 is able to control the lighting devices 31-34 via the wireless LAN access point 17 and the bridge 16.

The computer 21 comprises a receiver 23, a transmitter 24, a processor 25, and storage means 27. The processor 25 is configured to receive, via the receiver 23, a signal indicative of the user command for controlling lighting device 31 and/or 32. In the embodiment of FIG. 3, this signal is received from the bridge 16. The user command is provided by a user using an input modality, e.g. a button on one of the light control devices 36-38 or a touchscreen display of a mobile device 41.

The processor 25 is further configured to determine a suitability rating for the used input modality in relation to the user command, determine one or more further suitability ratings for one or more further input modalities in relation to the user command, and compare the suitability rating with the one or more further suitability ratings.

The processor 25 is also configured to output, via transmitter 24, information specifying an input modality recommended in relation to the user command. The recommended input modality is selected from the one or more further input modalities. The further suitability rating of the recommended input modality is higher than the suitability rating. The information may be transmitted to the mobile device 41, which then displays it on its display. Alternatively, the information may be transmitted in a different way, e.g. by e-mail, and output on a device other than a mobile device. In that case, a mobile device would not be involved.

In the embodiment of the computer 21 shown in FIG. 3, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 3, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 3, the computer 21 transmits data to the lighting devices 31-34 via the bridge 16. In an alternative embodiment, the computer 21 receives data from the lighting control devices 36-38 and transmits data to the lighting devices 31-34 without a bridge.

Figure 4:
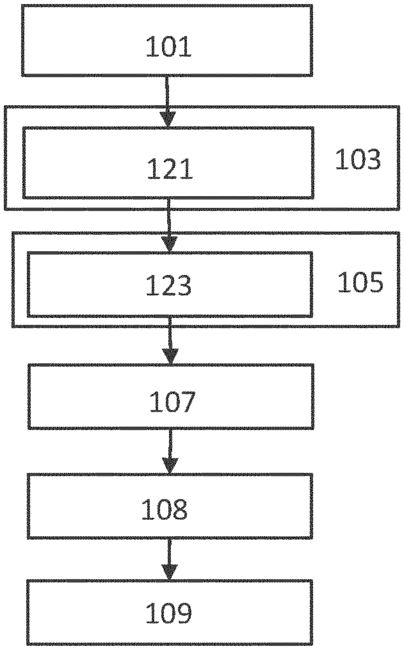
FIG. 4 is a flow diagram of a first embodiment of the method.

A first embodiment of the method of determining a suitability of an input modality for providing a user command for controlling at least one lighting device is shown in FIG. 4. The method may be performed by the mobile device 1 of FIG. 1 or the cloud computer 21 of FIG. 3, for example. A step 101 comprises receiving a signal indicative of the user command for controlling the at least one lighting device. The user command is provided by a user using the input modality.

A step 103 comprises determining a suitability rating for the used input modality in relation to the user command. A step 105 comprises determining one or more further suitability ratings for one or more further input modalities in relation to the user command. The used input modality and the one or more further input modalities may include one or more of voice input, light switch input, and sensor input, for example.

In the embodiment of FIG. 4, step 103 is implemented by a step 121 and step 105 is implemented by a step 123. In steps 121 and 123, the suitability rating and the one or more further suitability ratings are determined based on a size of a space in which the user command is provided, a function of the space, and/or a complexity of user interaction associated with providing the user command using the input modality.

Furthermore, in the embodiment of FIG. 4, in steps 121 and 123, the suitability rating and the one or more further suitability ratings are determined independent of a specific action specified in the user command. Examples of specific actions are selecting any light scene, selecting a specific light scene, switching off all lighting devices, and switching on all lighting devices.

The suitability of an input modality may be defined, for example, as a combination of ease of use (how easy is it to access a specific function), accessibility to different system features (what features could be controlled), and relevance and appropriateness to a context (does the specific interaction mean fits the context where interaction occurs).

A scoring system may be used to determine suitability ratings. This scoring system may, for example, determine the value that a device or a combination of devices generate if used for a given command. A device may be a mobile device running the Hue app or a Tap switch, for example. An example of a command is scrolling through pre-defined scenes in a room.

A step 107 comprises comparing the suitability rating determined in step 103 with the one or more further suitability ratings determined in step 123. A step 108 comprises selecting a single recommended input modality from the one or more further input modalities. The further suitability rating of the recommended input modality is higher than the suitability rating. A step 109 comprises outputting information specifying the recommended input modality which was selected in step 108. Steps 108 and 109 are not performed if the suitability rating determined in step 103 is higher than all further suitability ratings determined in step 105.

Figure 5:
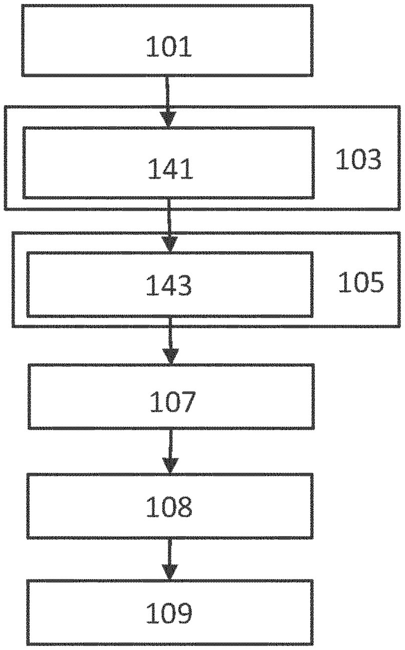
FIG. 5 is a flow diagram of a second embodiment of the method.

A second embodiment of the method of determining a suitability of an input modality for providing a user command for controlling at least one lighting device is shown in FIG. 5. Compared to the embodiment of FIG. 4, step 103 is implemented by a step 141 instead of by step 121 and step 105 is implemented by a step 143 instead of by step 123.

In steps 141 and 143, like in steps 121 and 123 of FIG. 4, the suitability rating and the one or more further suitability ratings are determined based on a size of a space in which the user command is provided, a function of the space, and/or a complexity of user interaction associated with providing the user command using the input modality.

Unlike in steps 121 and 123 of FIG. 4, in steps 141 and 143 of FIG. 5, the suitability rating and the one or more further suitability ratings are determined in dependence on a specific action specified in the user command. Examples of specific actions are selecting any light scene, selecting a specific light scene, switching off all lighting devices, and switching on all lighting devices.

Figure 6:
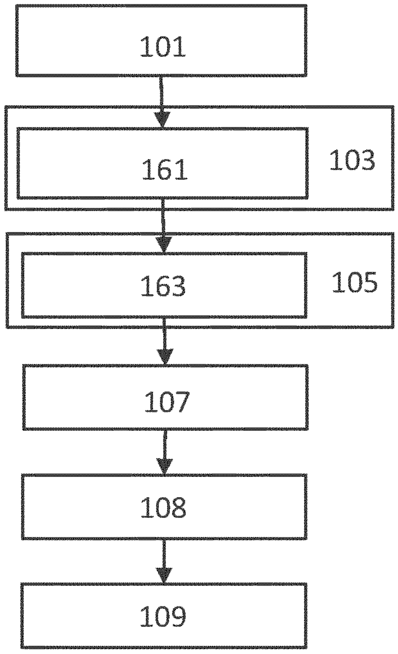
FIG. 6 is a flow diagram of a third embodiment of the method.

A third embodiment of the method of determining a suitability of an input modality for providing a user command for controlling at least one lighting device is shown in FIG. 6. Compared to the embodiment of FIG. 4, step 103 is implemented by a step 161 instead of by step 121 and step 105 is implemented by a step 163 instead of by step 123.

Steps 161 and 163 comprises obtaining the obtaining the suitability rating and the one or more further suitability ratings from a further system. The further system may calculate the suitability rating and the one or more further suitability ratings based on input modalities used by other users in relation to the user command. The other users may have a lighting system which has a similarity to a lighting system of the user which exceeds a first threshold and/or may have spaces which have a similarity to spaces of the user which exceeds a second threshold, for example. Alternatively, suitability ratings may have been associated with input modalities and user command-related parameter values (e.g. "select light scene" or "living room") by an administrator of the further system.

Step 161 may comprise transmitting information describing the used input modality and information describing the user command and/or context relating to the user command to the further system. Steps 161 and 163 may be combined into a single step in which the suitability rating and the one or more further suitability ratings are received at the same time.

Figure 7:
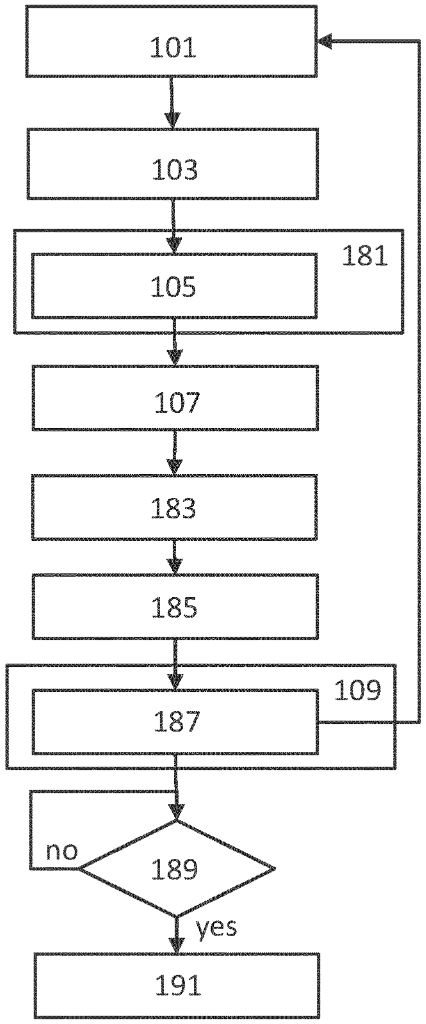
FIG. 7 is a flow diagram of a fourth embodiment of the method.

A fourth embodiment of the method of determining a suitability of an input modality for providing a user command for controlling at least one lighting device is shown in FIG. 7. Step 101 comprises receiving a signal indicative of the user command for controlling the at least one lighting device. The user command is provided by a user using the input modality.

Step 103 comprises determining a suitability rating for the used input modality in relation to the user command. Step 105 comprises determining one or more further suitability ratings for one or more further input modalities in relation to the user command.

In the embodiment of FIG. 7, step 105 is implemented by a step 181. Step 181 comprises determining one or more further suitability ratings for multiple further input modalities. The one or more further suitability ratings include at least one further suitability rating for a combination of two of the multiple further input modalities.

Step 107 comprises comparing the suitability rating determined in step 103 with the one or more further suitability ratings determined in step 181. A step 183 comprises selecting a recommended input modality or two recommended input modalities from the one or more further input modalities. The further suitability rating of the recommended input modality or the two recommended input modalities is higher than the suitability rating.

Next, a step 185 comprises determining settings for one or more lighting control devices based on the user command. The one or more lighting control devices are associated with the recommended input modality or at least one of the two recommended input modalities selected in step 183.

In the embodiment of FIG. 7, step 109 is implemented by a step 187. Step 187 comprises outputting information specifying the recommended input modality or modalities which were selected in step 183. A step 189 is performed after step 187. Additionally, step 101 may be repeated after step 187, after which the method proceeds as shown in FIG. 7.

Step 189 comprises detecting whether the one or more lighting control devices for which settings were determined in step 185 have been installed. If not, step 189 is repeated at a later time. A step 191 is performed when the one or more lighting control devices are detected. Step 191 comprises transmitting the settings determined in step 185 to the one or more lighting control devices for which the settings were determined.

Figure 8:
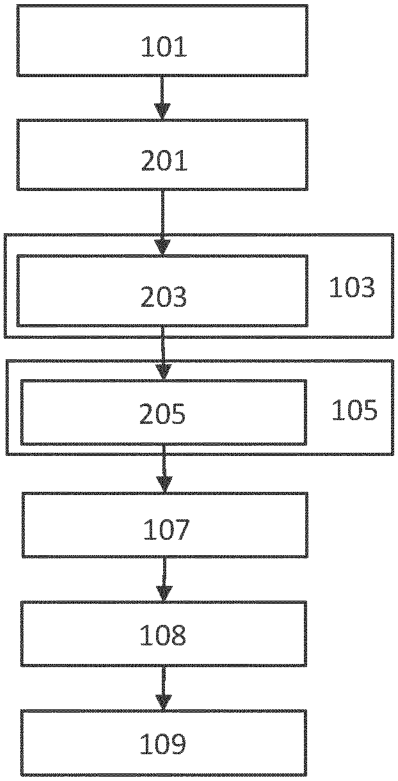
FIG. 8 is a flow diagram of a fifth embodiment of the method.

A fifth embodiment of the method of determining a suitability of an input modality for providing a user command for controlling at least one lighting device is shown in FIG. 8. This method is performed by a system. Step 101 comprises receiving a signal indicative of the user command for controlling the at least one lighting device. The user command is provided by a user using the input modality. A step 201 is performed after step 101. Step 201 comprises determining a user-dependent weight based on user-specified preferences and/or previous user commands provided by the user.

Next, step 103 comprises determining a suitability rating for the used input modality in relation to the user command and step 105 comprises determining one or more further suitability ratings for one or more further input modalities in relation to the user command. In the embodiment of FIG. 8, step 103 is implemented by a step 203 and step 105 is implemented by a step 205.

Step 203 comprises determining a user-independent suitability rating which is common to all users of the system and applying the user-dependent weight determined in step 201 to this user-independent suitability rating. Step 205 comprises determining one or more user-independent further suitability ratings which are common to all users of the system and applying the user-dependent weight determined in step 201 to these one or more user-independent further suitability ratings.

Weights may be defined as a function W(user, time) that evolves over time differently for each user, starting from a default definition common to all users. Examples of customization could be that, for a given user, voice control is not acceptable independently from how great it could be for certain interactions/commands. In a different example, the system can learn that a certain user could benefit from having a different ordering of the scenes in its dimmer switch based of the time of the day.

The evolution of the value over time enables continuous optimizations specific to each user. This can be used to provide tailored suggestions on how to configure the system, and to suggest new input modalities and how they could enable interesting interactions.

Step 107 comprises comparing the suitability rating determined in step 203 with the one or more further suitability ratings determined in step 205. Step 108 comprises selecting a recommended input modality from the one or more further input modalities when the further suitability rating of the recommended input modality is higher than the suitability rating. Step 109 comprises outputting information specifying the recommended input modality which was selected in step 108.

The embodiments of FIGS. 4 to 8 differ from each other in multiple aspects, i.e. multiple steps have been added or replaced. In variations on these embodiments, only a subset of these steps is added or replaced and/or one or more steps is omitted. As a first example, multiple of the embodiments of FIGS. 4 to 8, e.g. FIGS. 4 and 5, may be combined. As a second example, step 185, 189 and 191 may be omitted from the embodiment of FIG. 7 and/or added to one or more of the embodiments of FIGS. 4, 5, 6, and 8.

Figure 9:
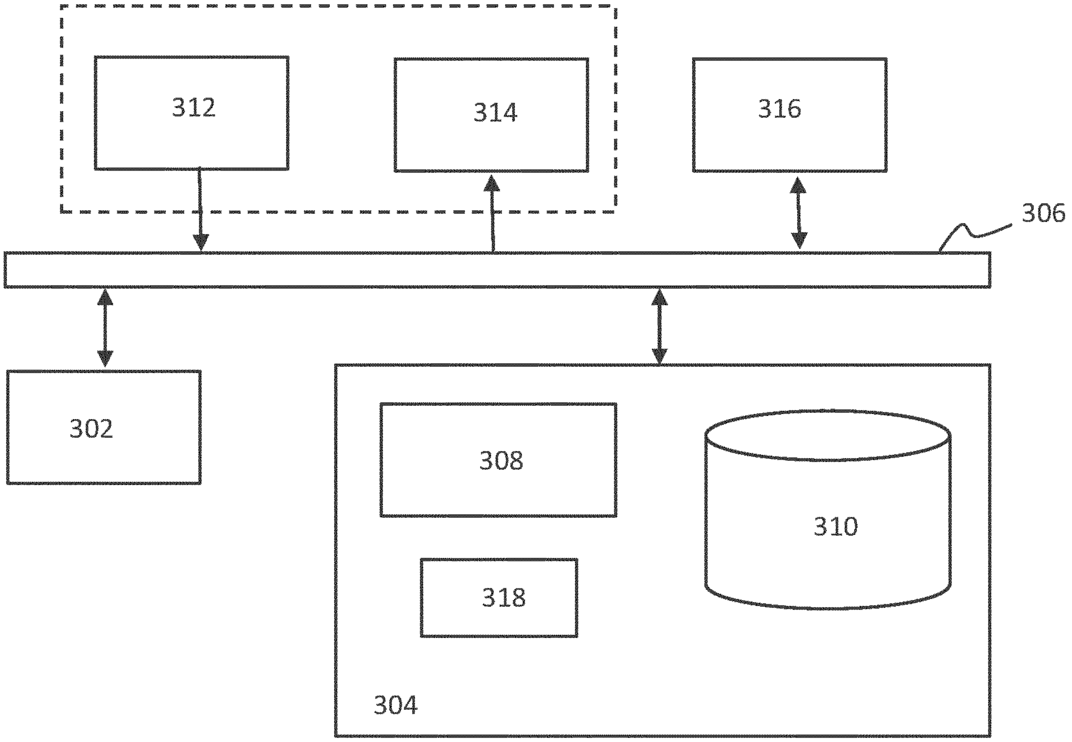
FIG. 9 is a block diagram of an exemplary data processing system for performing the method of the invention.

FIG. 9 depicts a block diagram illustrating an exemplary data processing system that may perform the method as described with reference to FIGS. 4 to 8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining a suitability of an input modality of a first input type for providing a user command for controlling at least one lighting device, said system comprising:

at least one receiver;

at least one output interface; and at least one processor configured to:

receive, via said at least one receiver, a signal indicative of said user command for controlling said at least one lighting device, said user command being provided by a user using said input modality of said first input type, determine a suitability rating for said used input modality in relation to said user command, and determine one or more further suitability ratings for one or more further input modalities in relation to said user command, determination of said suitability rating and said one or more further suitability ratings being based at least partially on a complexity of user interaction associated with providing said user command using said input modality of said first input type, compare said suitability rating with said one or more further suitability ratings, and output, via said at least one output interface, information specifying an input modality of a second input type recommended in relation to said user command, said recommended input modality of said second input type being selected from said one or more further input modalities, said further suitability rating of said recommended input modality being higher than said suitability rating.

2. The system as claimed in claim 1, wherein said at least one processor is configured to determine said suitability rating for said used input modality of said first input type in relation to said user command independent of a specific action specified in said user command.

3. The system as claimed in claim 1, wherein said at least one processor is configured to determine said suitability rating for said used input modality of said first input type in relation to said user command in dependence on a specific action specified in said user command.

4. The system as claimed in claim 2, wherein said specific action comprises selecting any light scene, selecting a specific light scene, switching off all lighting devices, or switching on all lighting devices.

5. The system as claimed in claim 1, wherein said at least one processor is further configured to determine said suitability rating and said one or more further suitability ratings based on a size of a space in which said user command is provided and/or a function of said space.

6. The system as claimed in claim 1, wherein said at least one processor is configured to determine said suitability rating and said one or more further suitability ratings by obtaining said suitability rating and said one or more further suitability ratings from a further system.

7. The system as claimed in claim 1, wherein said suitability rating and said one or more further suitability ratings are calculated based on input modalities used by other users in relation to said user command.

8. The system as claimed in claim 7, wherein said other users have a lighting system which has a similarity to a lighting system of said user which exceeds a first threshold and/or have spaces which have a similarity to spaces of said user which exceeds a second threshold.

9. The system as claimed in claim 1, wherein said at least one processor is configured to determine settings for a lighting control device based on said user command, said lighting control device being associated with said recommended input modality of said second input type, and transmit, via said at least one output interface, said settings to said lighting control device.

10. The system as claimed in claim 1, wherein said information also specifies a further recommended input modality in relation to said user command, said further recommended input modality being selected from said one or more further input modalities, said further suitability rating of said combination of said recommended input modality and said further recommended input modality being higher than said suitability rating.

11. The system as claimed in claim 1, wherein said used input modality of said first input type and said one or more further input modalities include one or more of voice input, light switch input, and sensor input.

12. The system as claimed in claim 1, wherein said at least one processor is configured to determine said suitability rating for said used input modality of said first input type in relation to said user command by determining a user-independent suitability rating which is common to all users of said system and applying a user-dependent weight to said user-independent suitability rating.

13. The system as claimed in claim 12, wherein said at least one processor is configured to determine said user-dependent weight based on user-specified preferences and/or previous user commands provided by said user.

14. A method of determining a suitability of an input modality of a first input type for providing a user command for controlling at least one lighting device, said method comprising:

receiving a signal indicative of said user command for controlling said at least one lighting device, said user command being provided by a user using said input modality of said first input type;

determining a suitability rating for said used input modality in relation to said user command, and determining one or more further suitability ratings for one or more further input modalities in relation to said user command, determining said suitability rating and said one or more further suitability ratings being based at least partially on a complexity of user interaction associated with providing said user command using said input modality of said first input type;

comparing said suitability rating with said one or more further suitability ratings; and outputting information specifying an input modality of a second input type recommended in relation to said user command, said recommended input modality of said second type being selected from said one or more further input modalities, said further suitability rating of said recommended input modality being higher than said suitability rating.

15. A non-transitory computer program code to perform the method of claim 14 when run on a processor.

* * * * *